A. W. WILKINSON.
Scrubber or Purifier for Illuminating Gas.
No. 218,611. Patented Aug. 12, 1879.
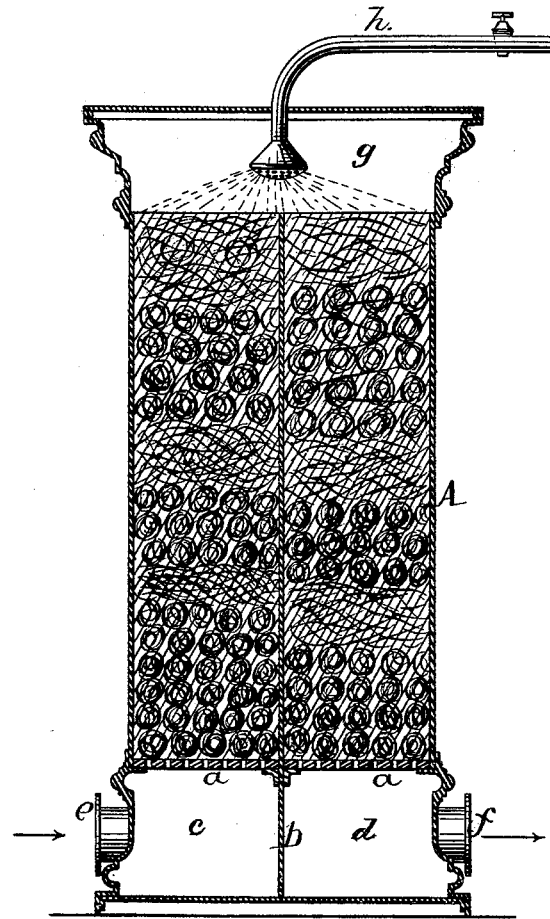

UNITED STATES PATENT OFFICE.

ASA W. WILKINSON, OF NEW YORK, N. Y.

IMPROVEMENT IN SCRUBBERS OR PURIFIERS FOR ILLUMINATING-GAS.

Specification forming part of Letters Patent No. 218,611, dated August 12, 1879; application filed July 1, 1878.

*To all whom it may concern:*

Be it known that I, ASA W. WILKINSON, of the city, county, and State of New York, have invented a new and useful Improvement in Scrubbers or Purifiers for Illuminating-Gas, which improvement is fully set forth in the following specification, reference being had to the accompanying drawing, which represents a vertical section.

This invention relates to certain improvements in apparatus for scrubbing and condensing illuminating-gas; and consists in the combination, with a gas scrubbing or condensing chamber filled with metal turnings or pieces of metal rolled into pellets, of a water-chamber at the top of the said scrubber or condenser, connected with a water-supply for introducing currents of water among the metal filling material, whereby a minute separation of the currents of gas and water is effected, and particles of the gas and water brought into contact with each other to eliminate impurities, and the metal filling is maintained in a cool condition for depositing the tar and absorbing ammonia, as hereinafter fully described.

In the example shown in the drawing, the letter A designates a scrubber, which is provided with a false open bottom, $a$, and with a vertical partition, $b$, which divides the same into two compartments, $c\ d$, one of which connects with the gas-supply pipe $e$, and the other with the gas-discharge pipe $f$.

The compartments $c\ d$ are filled with scraps of sheet metal or metal turnings, which may either be rolled into loose balls or otherwise loosely packed in said compartments, and above the compartments $c\ d$ is formed a chamber, $g$, which connects with a suitable water-supply pipe, $h$.

Heretofore it has been common to employ pieces of brick, pebbles, or coke in scrubbers or purifiers for the purpose of dividing the current of gas and the current of water; but I have found that by using scraps of sheet metal or metal turnings in place of bricks, pebbles, or coke several important advantages are obtained.

In the first place the scraps of sheet metal or metal turnings present an immense surface, by which a minute separation is effected of the currents of gas and water, so that each particle of gas is brought in contact with a corresponding particle of water, and thereby the elimination of impurities from the gas is materially facilitated; secondly, the scraps of sheet metal or metal turnings, being good conductors of heat, are kept cool by the current of water, which constantly acts on them, so that the gas, in passing through such scraps, is cooled off, and thereby the deposition of tar from the gas and the absorption of ammonia are facilitated; thirdly, the scraps of sheet metal or metal turnings do not absorb water nor tar or other impurities contained in the gas, so that the purification of the gas can be effected with a comparatively small quantity of water, and the scraps can be easily washed by stopping the supply of gas and passing through the scrubber a current of clean water.

The material which I use, by preference, is scraps of tinned sheet-iron, which can be obtained in large abundance, and easily rolled in loose balls suitable for my purpose.

I am aware that a fixed gas has been conveyed by a pipe to a gas strainer or condenser composed of a metallic box provided with a perforated sheet-iron plate arranged horizontally at or near the upper part, and which is covered with iron-shavings, the gas entering the aforesaid box beneath said perforated plate, and passing upward through the same and the iron-shavings, the object being to collect all condensable matter from the vapor or gas. Such is not my invention, and is therefore disclaimed.

What I claim as new, and desire to secure by Letters Patent, is—

The combination, with a gas scrubbing or condensing chamber filled with metal turnings or pieces of metal rolled into pellets, of a water-chamber at the top of the said scrubber or condenser, connected with a water-supply for introducing currents of water among the metal filling material, whereby a minute separation of the currents of gas and water is effected, and particles of the gas and water brought in contact with each other to eliminate impurities, and the metal filling is maintained in a cool condition for depositing the tar and absorbing ammonia, substantially as described.

In testimony that I claim the foregoing as my own I affix my signature in presence of two witnesses.

ASA W. WILKINSON.

Witnesses:
 FRANK P. WHITE,
 T. W. F. SHEFFER.